(12) United States Patent
Pannell (10) Patent No.: US 9,590,910 B1
(45) Date of Patent: Mar. 7, 2017

(54) METHODS AND APPARATUS FOR HANDLING MULTICAST PACKETS IN AN AUDIO VIDEO BRIDGING (AVB) NETWORK

(75) Inventor: Donald Pannell, Cupertion, CA (US)

(73) Assignee: Marvell International Ltd., Hamilton (BM)

( * ) Notice: Subject to any disclaimer, the term of this patent is extended or adjusted under 35 U.S.C. 154(b) by 133 days.

(21) Appl. No.: 13/115,670

(22) Filed: May 25, 2011

Related U.S. Application Data

(60) Provisional application No. 61/348,693, filed on May 26, 2010.

(51) Int. Cl.
*H04L 12/743* (2013.01)
*H04L 12/931* (2013.01)
*H04L 12/851* (2013.01)

(52) U.S. Cl.
CPC ........ H04L 47/2408 (2013.01); H04L 49/201 (2013.01); H04L 45/7453 (2013.01)

(58) Field of Classification Search
CPC ........ H04L 12/28; H04L 12/46; H04L 12/56; H04L 12/413; H04L 47/2408; H04L 49/201; H04L 45/7453
See application file for complete search history.

(56) References Cited

U.S. PATENT DOCUMENTS

| | | | |
|---|---|---|---|
| 5,953,019 A * | 9/1999 | Shimakawa et al. | 345/535 |
| 6,052,683 A * | 4/2000 | Irwin | 707/758 |
| 6,377,782 B1 * | 4/2002 | Bishop et al. | 455/3.01 |
| 6,510,138 B1 | 1/2003 | Pannell | |
| 6,816,489 B1 | 11/2004 | Patra et al. | |
| 6,819,653 B1 | 11/2004 | Hodgins et al. | |
| 6,987,770 B1 * | 1/2006 | Yonge, III | 370/401 |
| 7,035,273 B1 | 4/2006 | Pannell et al. | |
| 7,110,415 B1 | 9/2006 | Walsh et al. | |
| 7,209,440 B1 | 4/2007 | Walsh et al. | |
| 7,457,297 B2 | 11/2008 | Woo et al. | |
| 2002/0087723 A1 * | 7/2002 | Williams et al. | 709/240 |
| 2005/0027837 A1 | 2/2005 | Roese et al. | |
| 2005/0054370 A1 | 3/2005 | Shpak | |

(Continued)

OTHER PUBLICATIONS

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, , Sections 1-5, Dec. 9, 2005.

(Continued)

*Primary Examiner* — Walter Divito (57) ABSTRACT

It is determined whether a packet is a multicast packet, and an index to a database is selected from i) a first candidate index determined based on header information of the packet, or ii) a second candidate index determined based on the header information, based on whether the packet is a multicast packet. Information is retrieved from the database using the index, and the header information is compared with information retrieved from the database. Further information retrieved from the database is used to determine one or more ports via which the packet should be transmitted when the header information matches the information retrieved from the database.

12 Claims, 4 Drawing Sheets

(56) References Cited

U.S. PATENT DOCUMENTS

| | | | |
|---|---|---|---|
| 2005/0220105 A1* | 10/2005 | Yen et al. | 370/392 |
| 2005/0281235 A1 | 12/2005 | Beach et al. | |
| 2007/0153802 A1 | 7/2007 | Anke et al. | |
| 2008/0037567 A1 | 2/2008 | Cho et al. | |
| 2008/0112433 A1 | 5/2008 | Feng et al. | |
| 2008/0114887 A1* | 5/2008 | Bryers et al. | 709/230 |
| 2008/0123531 A1* | 5/2008 | Gerkis | 370/235 |
| 2008/0212591 A1* | 9/2008 | Wu et al. | 370/395.21 |
| 2008/0285574 A1 | 11/2008 | Teener | |
| 2008/0288638 A1 | 11/2008 | Diab et al. | |
| 2009/0016217 A1* | 1/2009 | Kashyap | 370/231 |
| 2009/0031044 A1* | 1/2009 | Barrack et al. | 709/247 |
| 2009/0049175 A1 | 2/2009 | Finn | |
| 2009/0160943 A1* | 6/2009 | Badt et al. | 348/180 |
| 2009/0180389 A1 | 7/2009 | Mack-Crane et al. | |
| 2009/0201844 A1 | 8/2009 | Bhatti et al. | |
| 2010/0122098 A1* | 5/2010 | Kay | 713/310 |
| 2010/0220724 A1* | 9/2010 | Rabie et al. | 370/392 |
| 2010/0238836 A1* | 9/2010 | Diab et al. | 370/254 |
| 2011/0044226 A1* | 2/2011 | Song et al. | 370/312 |

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, May 7, 2003.

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, Aug. 17, 2005, 60 pages.

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, Oct. 2004.

Office Action in U.S. Appl. No. 13/115,865 dated Feb. 15, 2013 (21 pages).

Office Action in U.S. Appl. No. 13/115,865 dated Jul. 23, 2013 (24 pages).

Office Action in U.S. Appl. No. 13/115,865 dated Feb. 4, 2014 (25 pages).

Office Action in U.S. Appl. No. 13/115,865 dated Jun. 30, 2014 (24 pages).

Office Action in U.S. Appl. No. 13/115,865 dated May 12, 2014 (15 pages).

Office Action in U.S. Appl. No. 13/115,868 dated Feb. 26, 2013 (16 pages).

Office Action in U.S. Appl. No. 13/115,868 dated Jul. 9, 2013 (19 pages).

Office Action in U.S. Appl. No. 13/115,868 dated Feb. 3, 2014 (16 pages).

Office Action in U.S. Appl. No. 13/115,868 dated Jul. 2, 2014 (17 pages).

Office Action in U.S. Appl. No. 13/115,868 dated Apr. 8, 2015 (15 pages).

Office Action in U.S. Appl. No. 13/115,682 dated Feb. 13, 2013 (21 pages).

Office Action in U.S. Appl. No. 13/115,682 dated Aug. 21, 2013 (24 pages).

Office Action in U.S. Appl. No. 13/115,682 dated Jan. 15, 2014 (24 pages).

Office Action in U.S. Appl. No. 13/115,682 dated Jun. 18, 2014 (23 pages).

Office Action in U.S. Appl. No. 13/115,682 dated Apr. 8, 2015 (16 pages).

U.S. Appl. No. 13/115,868, Pannell et al., "Enhanced Audion Video Bridging (AVB) Methods and Apparatus," filed May 25, 2011.

U.S. Appl. No. 13/115,682, Pannell et al., "Methods and Apparatus for Handling Management Packets in an Audio Video Bridging (AVB) Network," filed May 25, 2011.

U.S. Appl. No. 13/115,865, Pannell et al., "Enhanced Audio Video Bridging (AVB) Methods and Apparatus," filed May 25, 2011.

IEEE P802.1AS/D0.8, "Draft Standard for Local and Metropolitan Area Networks—Timing and Synchronization for Time-Sensitive Applications in Bridged Local Area Networks," *The Institute of Electrical and Electronics Engineers, Inc.*, pp. 1-149 (May 25, 2007).

Abstract of IEEE 802.1AS Standard, "802.1AS—Timing and Synchronization," *The Institute of Electrical and Electronics Engineers, Inc.*, available at http://www.ieee802.org/1/pages/802.1as.html, 1 page (Mar. 30, 2011).

\* cited by examiner

METHODS AND APPARATUS FOR HANDLING MULTICAST PACKETS IN AN AUDIO VIDEO BRIDGING (AVB) NETWORK

CROSS-REFERENCES TO RELATED APPLICATIONS

This disclosure claims the benefit of U.S. Provisional Patent Application No. 61/348,693, entitled "AUDIO VIDEO BRIDGING POLICY ENHANCEMENTS," filed on May 26, 2010, which is hereby incorporated by reference herein in its entirety.

This disclosure is related to the following U.S. patent applications filed on the same day as the present application:

U.S. patent application Ser. No. 13/115,865 entitled "ENHANCED AUDIO VIDEO BRIDGING (AVB) METHODS AND APPARATUS";

U.S. patent application Ser. No. 13/115,868 entitled "ENHANCED AUDIO VIDEO BRIDGING (AVB) METHODS AND APPARATUS";

U.S. patent application Ser. No. 13/115,682 entitled "METHODS AND APPARATUS FOR HANDLING MANAGEMENT PACKETS IN AN AUDIO VIDEO BRIDGING (AVB) NETWORK".

All of the above U.S. patent applications are hereby incorporated by reference herein in their entireties.

FIELD OF THE DISCLOSURE

The present disclosure relates generally to communication networks and, more particularly, to switch devices for handling low-latency streams.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Audio Video Bridging (AVB), is a set of standards developed and being developed by the Institute for Electrical and Electronics Engineers (IEEE) 802.1 working group with the intent of supporting real-time traffic, such as audio traffic and video traffic, with defined latencies and guaranteed delivery.

This is a change in direction as compared to past communication network protocols, such as the IEEE 802.3 Ethernet standard and the IEEE 802.11 wireless local area network (WLAN) standards, that are designed to be 'best effort' protocols. 'Best effort' here means that there are no guarantees of delivery nor is the latency through the network reasonably definable. These older Ethernet and WLAN networks are allowed to drop (or discard) data at Layer 1 and/or Layer 2, and it is the responsibility of higher layer protocols in the protocol stack to insure reliable delivery of data by the re-transmission of the dropped portions. Such re-transmissions insure users get the full content of their e-mails and other file transfers, but the re-transmissions do not help when the data is time sensitive such as audio and/or video streams. Re-transmission cannot be done in these cases as the window of usage of the information has usually past (i.e., the re-transmitted data typically shows up too late to help).

A phone conversation is an example application that uses real-time audio. The quality of a phone connection is typically excellent when making a POTS (Plain Old Telephone System) call. However, the same call using via the Internet is generally not as good and may not be acceptable at the present day. This is because a POTS network guarantees enough bandwidth for each call with defined latencies. The Internet currently cannot provide such guarantees.

A goal of AVB is to support real-time data streams with defined latencies and guaranteed delivery, over Ethernet- and WLAN-type networks, while at the same time allowing the previous (and future) applications to continue functioning on these same networks.

Devices configured to operate according to AVB (AVB devices) periodically exchange timing information that allows both ends of a link to synchronize their time base reference clock very precisely. This precise synchronization allows synchronization of multiple streams and provides a common time base for sampling/receiving data streams at a source device and presenting those streams at the destination device with the same relative timing.

AVB utilizes stream reservations to help insure that an AVB stream can start (or be joined to) only if all the bridges in the path of the stream have sufficient resources to support the stream. Resources include available buffers and bandwidth of the links. Additionally, AVB reservations help insure that no more than 75% of a link's bandwidth (as a default) is used for AVB streams. This helps insure the applications of the network can continue to function as before.

AVB also utilizes stream shaping to define how AVB data should be transmitted in the absence of congestion. Traffic shaping is a process of smoothing out the traffic for a stream so that the packets making up the stream are evenly distributed in time. If traffic shaping is not done at sources and bridges, then packets of a stream tend to "bunch" into bursts of traffic that can overwhelm buffers in subsequent bridges, switches and other infrastructure devices. AVB implements traffic shaping using existing IEEE 802.1Q forwarding and priority mechanisms but also defines a particular relationship between priority tags and frame forwarding behavior at endpoints and bridges.

SUMMARY

In one embodiment, a method implemented in a network device includes determining whether a packet is a multicast packet, and selecting as an index to a database i) a first candidate index determined based on header information of the packet, or ii) a second candidate index determined based on the header information, based on whether the packet is a multicast packet. The method also includes retrieving information from the database using the index, and comparing the header information with information retrieved from the database. The method additionally includes using further information retrieved from the database to determine one or more ports via which the packet should be transmitted when the header information matches the information retrieved from the database.

In another embodiment, a network device comprises a selector unit configured to select as an index i) a first candidate index determined based on header information of a packet, or ii) a second candidate index determined based on the header information. The network device also comprises a mode selection unit configured to control the selector unit based on whether the packet is a multicast packet, and a database coupled to the selector unit. Additionally, the network device comprises a comparison unit configured to retrieve information from the database using the index, compare the header information with information retrieved from the database, and generate a match indicator when the header information matches information retrieved from the database.

In yet another embodiment, a method implemented in a network device includes comparing a portion of a destination address of a packet to an organizationally unique identifier, and determining whether the packet is to be handled according to a defined throughput and/or a defined latency, and discarding the packet when i) it determined that the portion of the destination address matches the organizationally unique identifier, and ii) when it is determined that the packet is not to be handled according to a defined throughtput and/or a defined latency.

In still another embodiment, a network device comprises a plurality of ports including a first port, and an ingress processing unit coupled to the first port. The ingress processing unit is configured to compare a portion of a destination address of a packet to an organizationally unique identifier, and determine whether the packet is to be handled according to a defined throughput and/or a defined latency. The ingress processing unit is also configured to discard the packet when i) it determined that the portion of the destination address matches the organizationally unique identifier, and ii) when it is determined that the packet is not to be handled according to a defined throughput and/or a defined latency.

DETAILED DESCRIPTION

In embodiments described below, a network device such as a Layer-2 and/or Layer 3 switch/router/bridge device (referred to herein as a "switch" for convenience) is configured to operate according to the Audio Video Bridging (AVB) protocol being developed by the IEEE 802.1 working group. In various embodiments, the switch is configured to provide one or more enhancements that enable improved performance of the switch and/or network. Some of the enhancements enable improved handling of multicast packets.

Figure 1:
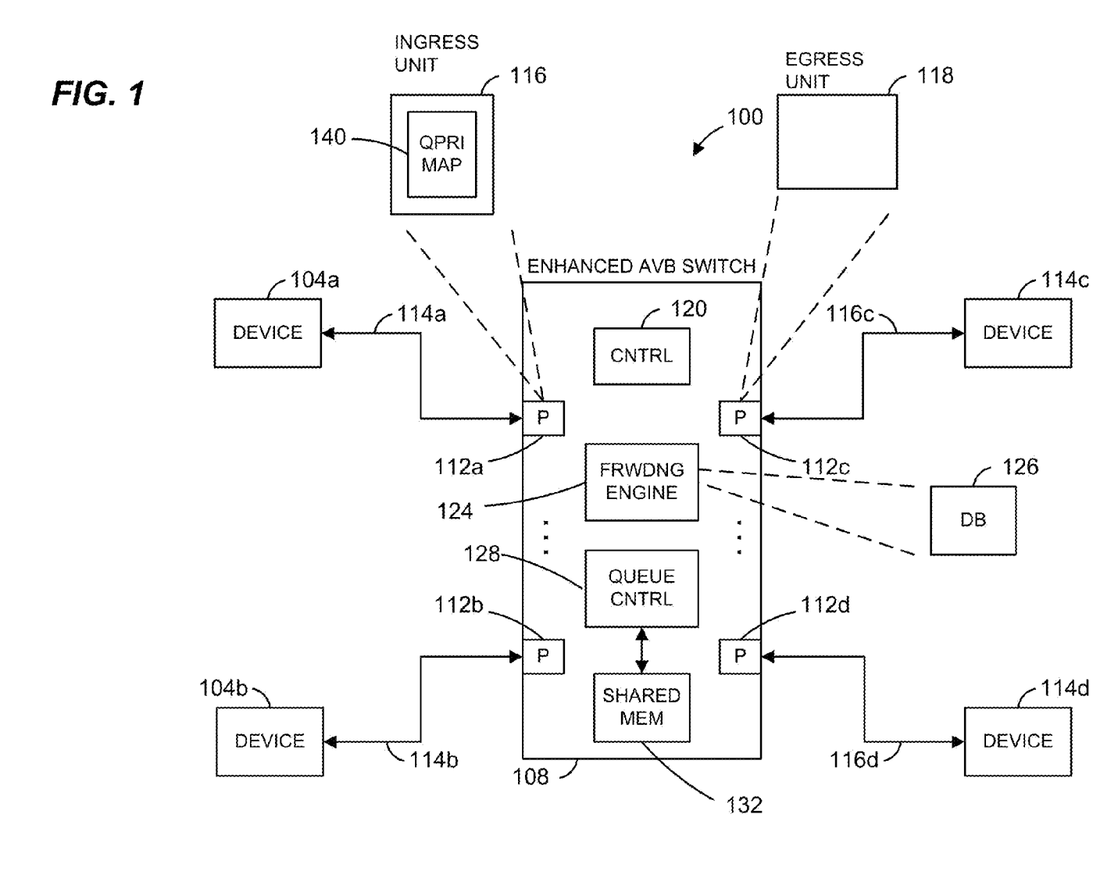
FIG. 1 is a block diagram of an example network 100 according to an embodiment.

FIG. 1 is a block diagram of an example network 100 according to an embodiment. The network 100 includes a plurality of devices 104 communicatively coupled to a switch 108. The switch 108 (referred to herein as an "enhanced AVB switch") is configured to operate according to the AVB protocol and configured to provide one or more enhancements that enable improved performance of the switch 108 and/or network 100, in some embodiments.

The enhanced AVB switch 108 includes a plurality of ports 112. The plurality of devices 104 are communicatively coupled to the enhanced AVB switch 108 via the ports 112. For example, the device 104a is communicatively coupled to the port 112a; the device 104b is communicatively coupled to the port 112b, and so on. Although the enhanced AVB switch 108 is depicted in FIG. 1 as having at least four ports 112, the enhanced AVB switch 108 includes a different suitable number of ports in other embodiments. Although the network 100 is depicted in FIG. 1 as having four devices 104, the network 100 includes a different suitable number of devices 104 in other embodiments. Each device 104 is a suitable electronic device that sources data, is a destination of data sourced by another device 104, or forwards data. For example, the devices 104 may include one or more of desktop computers, laptop computers, smart phones, audio/visual equipment, network attached storage devices, printers, network switches, etc. Each device 104 is configured to transmit and receive packets via a respective communication link 114. Similarly, each port 112 is configured to transmit and received packets via the respective communication link 114.

In some embodiments and/or scenarios, a first set of one or more of the devices 104 are configured to operate according to the AVB protocol (referred to herein as "AVB devices"), whereas a second set of one or more of the devices 104 are not configured to operate according to the AVB protocol (referred to herein as "non-AVB devices"). In some embodiments, if an AVB device 104 is coupled to a port 112, the port 112 is configured to operate generally according to the AVB protocol (referred to sometimes herein as an "AVB port"). On the other hand, if a non-AVB device 104 is coupled to a port 112, the port 112 is not configured to operate according to the AVB protocol (referred to sometimes herein as a "non-AVB port"). In some embodiments, each port 112 is configured to determine whether the port 112 is coupled to an AVB device or a non-AVB device such as by communicating with the device 104 coupled to the port 112.

In an embodiment, each port 112 includes an ingress processing unit 116. The ingress processing unit 116 generally processes packets that ingress via the port 112. Similarly, in an embodiment, each port includes an egress processing unit 118. The egress processing unit 118 generally processes packets that egress via the port 112.

In an embodiment, the enhanced AVB switch 108 includes a controller 120 that configures the ports 112 to either operate generally according to the AVB protocol or not according to the AVB protocol. In an embodiment, the controller 120 includes a processor that executes machine readable instructions stored in a memory of, or coupled to, the controller 120 (not shown). The controller 120 is coupled to the ports 112. In an embodiment, the controller 120 is configured to determine whether a port 112 is coupled to an AVB device or a non-AVB device such as by communicating with the device 104 coupled to the port 112.

The enhanced AVB switch 108 also includes a forwarding engine 124 coupled to the ports 112 (coupling not shown in FIG. 1 for clarity). The forwarding engine 124 is configured to determine via which port or ports 112 a packet, which was received via one of the ports 112, should be transmitted. In some embodiments, the forwarding engine 124 analyzes data in a header of the packet to determine via which port or ports 112 the packet should be transmitted. For example, the forwarding engine 124 analyzes one or more of a destination address (unicast, multicast, or broadcast), a virtual local area network (VLAN) tag, etc., in the packet. The forwarding engine 124 includes a forwarding database 126 that stores forwarding information for different destination addresses (e.g., media access control (MAC) addresses, Internet Protocol (IP) addresses, VLANs, multicast addresses, etc.). In an embodiment, the forwarding engine 124 includes an address translation unit (ATU).

In an embodiment, the ingress units 116 of the ports 112 are coupled to the forwarding engine 124. For a port 112 via which a packet ingressed (an ingress port 112), the ingress port 112 utilizes forwarding information regarding the packet from the forwarding engine 124 to determine the port or ports 112 via which the packet is to be egressed (egress port(s) 112).

The enhanced AVB switch 108 also includes a queue controller 128 coupled to a shared memory 132. The queue controller 128 and the shared memory 128 are also coupled to the ports 112 (coupling not shown in FIG. 1 for clarity). When a packet is received via an ingress port 112, the ingress processing unit 116 of the ingress port 112 requests and receives one or more pointers from the queue controller 128. The ingress processing unit 116 then stores the packet at one or more buffers in the shared memory 132 that are indicated by the received pointers.

The ingress processing unit 116 interfaces with the forwarding engine 124 to determine the appropriate one or more ports 112 for egress (egress port(s)). The ingress processing unit 116 then sends the selected pointers and indications of the one or more egress ports(s) to the queue controller 128. The queue controller 128 then sends the pointers to the appropriate one or more egress port(s) 112. These egress port(s) 112 then retrieve the packet from the buffers indicated by the pointers and transmit the packet via respective links 116. These egress port(s) 112 then release the pointers for use by another incoming packet.

As will be described in more detail below, the ingress processing unit 116 includes a queue priority mapper 140 that generally determines a queue priority indicator that indicates an egress queue into which a packet should be placed, where different egress queues correspond to different priorities.

Figure 2:
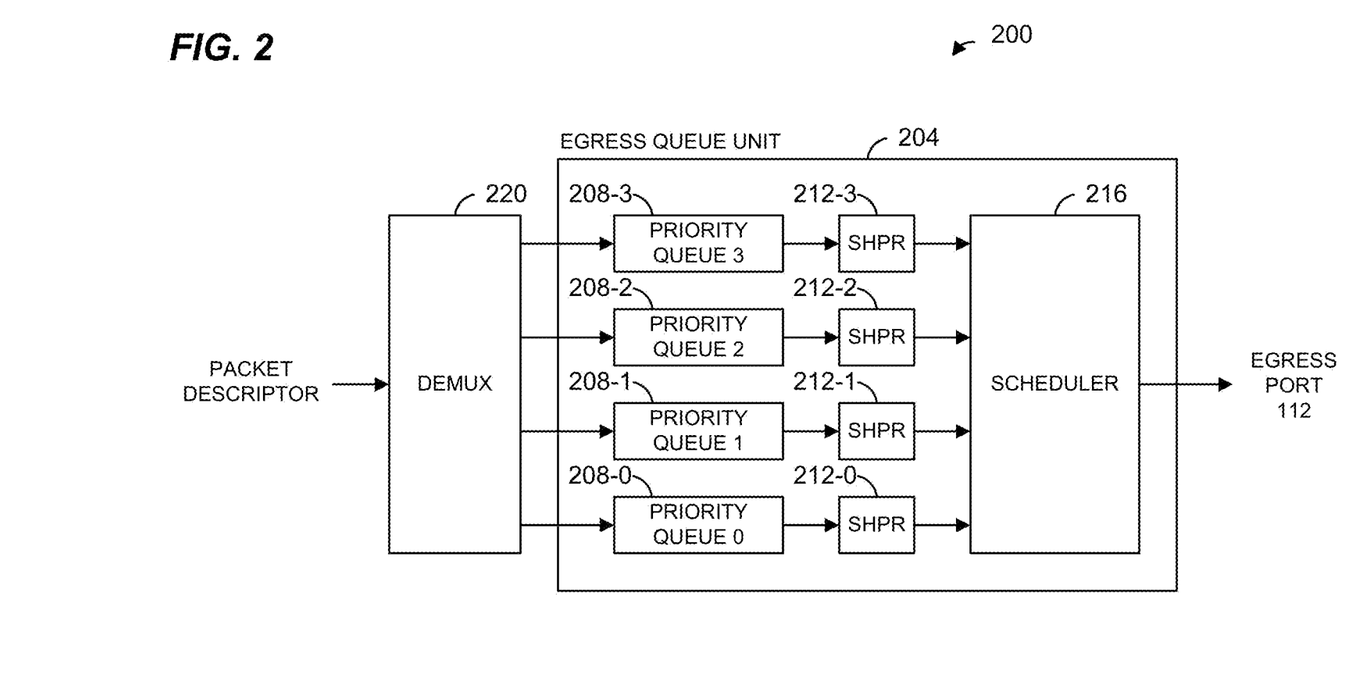
FIG. 2 is a block diagram of an example portion of a queue controller of FIG. 1, according to an embodiment.

FIG. 2 is a block diagram of an example portion 200 of the queue controller 128 of FIG. 1, according to an embodiment, and FIG. 2 will be described with reference to FIG. 1. The queue controller 128 includes a portion 200 for each port 112. The portion 200 includes an egress queue unit 204 coupled to the associated port 112. The egress queue unit 204 handles enqueuing packets for egress via the associated port 112.

More specifically, the egress queue unit 204 enqueues packet descriptors corresponding to packets and received from the forwarding engine 124. Each packet descriptor includes a pointer to a packet stored in one or more buffers in the shared memory 132. In some embodiments, the descriptor includes other information regarding the packet. For example, the descriptor includes a frame priority indicator associated with the packet, in an embodiment. The frame priority indicator indicates a priority assigned to the packet for transmission in the network and/or handling by the enhanced AVB switch, in an embodiment. The frame priority indicator is determined based on one or more of an IEEE 802.1p priority code point (PCP) field of an IEEE 802.1Q Standard VLAN tag in a header of the packet, a Differentiated Services Code Point (DSCP) field in an Internet Protocol (IP) header of the packet, an IP precedence field in the IP header, the port via which the packet was received, etc., in some embodiments. In another embodiment, the descriptor does not include the frame priority indicator.

The egress queue unit 204 includes a plurality of priority queues 208 corresponding to different priorities. In the example of FIG. 2, the egress queue unit 204 includes four priority queues 208 with priorities 3, 2, 1 and 0, where priority 3 is a highest priority and priority 0 is a lowest priority, in an embodiment. In other embodiments, another suitable number of priority queues 208 is utilized. Each queue 208 stores descriptors of packets to be transmitted from the egress port 112.

The egress queue unit 204 also includes a plurality of shaper units 212 coupled to the plurality of priority queues 208. In the example of FIG. 2, the egress queue unit 204 includes four shaper units 212 corresponding to the four priority queues 208, in an embodiment. In other embodiments, another suitable number of shaper units 212 is utilized. For example, in one embodiment, the shapers 212-0 and 212-1 are omitted. Each shaper unit 212 is configured to smooth out the traffic from the corresponding priority queue 208 so that the packets in the priority queue 208 making up a stream are evenly distributed in time.

A scheduler 216 is coupled to the egress port 112 and the priority queues 208 (via shaper units 212 in some embodiments). The scheduler 216 is configured to pass descriptors from the priority queues 208 to the egress port 112 in a manner such that precedence according to priority is given. In an embodiment, the scheduler 216 implements a strict priority queuing scheme. In other embodiments, other suitable weighting schemes are used, such as weighted fair priority queuing. According to weighted fair queuing, frames are processed so that over time, higher-priority frames are transmitted more often than lower-priority frames according to a predetermined weighting scheme and sequence. One example weighting scheme for four priorities is "8-4-2-1", in an embodiment. According to 8-4-2-1 weighting, in 15 consecutive time units, eight time units are allocated to priority 3, four time units are allocated to priority 2, two time units are allocated to priority 1, and one time unit is allocated to priority 0.

A demultiplexer unit 220 receives packet descriptors from the forwarding engine 124 and determines in which one of the priority queues 208 each packet descriptor should be placed. In an embodiment, the demultiplexer unit 220 analyzes a frame priority indictor of a packet and determines the appropriate priority queue 208 based on the priority tag of the packet. According to the AVB protocol, packets having an IEEE 802.1Q PCP field with a value 3 should be placed in the priority queue 208-3 (as a default); packets having an IEEE 802.1Q PCP field with a value 2 should be placed in the priority queue 208-2 (as a default); and, packets having an IEEE 802.1Q PCP field with a value other than 2 or 3 should be placed in a priority queue with a lower priority than the priority queue 208-2 or the priority queue 208-3 (as a default), e.g., in the priority queue 208-1 or the priority queue 208-0. The demultiplexer unit 220 then places the packet descriptor in the determined priority queue 208. According to the AVB protocol, a switch device can be configured so that packets having an IEEE 802.1Q PCP field with a value different than 3 are to be placed in the priority queue 208-3; and packets having an IEEE 802.1Q PCP field with a value different than 2 are to be placed in the priority queue 208-2.

In an embodiment, the demultiplexer unit 220 determines the appropriate priority queue 208 further based on whether the egress port 112 is coupled to an AVB device. For example, for a particular frame priority indicator, the demultiplexer unit 220 determines a first priority queue 208 when the egress port 112 is coupled to an AVB device and determines a second priority queue 208, different than the first priority queue 208 at least in some scenarios, when the egress port 112 is coupled to a non-AVB device, in an embodiment. As a specific example, for a frame priority indicator that corresponds to a IEEE 802.1Q PCP field with a value of three (as an example), the demultiplexer unit 220 determines the priority queue 208-3 when the egress port 112 is coupled to an AVB device and determines a priority queue 208 other than the priority queue 208-3, at least in some scenarios, when the egress port 112 is coupled to a non-AVB device, in an embodiment. As another specific example, for a frame priority indicator that corresponds to a IEEE 802.1Q PCP field with a value of two (as an example), the demultiplexer unit 220 determines the priority queue 208-2 when the egress port 112 is coupled to an AVB device 104 and determines a priority queue 208 other than the priority queue 208-2, at least in some scenarios, when the egress port 112 is coupled to a non-AVB device 104, in an embodiment.

In an embodiment, the portion 200 of the queue controller 128 corresponds to a particular port 112, and is configurable to operate in a first mode when the port 112 is communicatively coupled to a device that operates according to the AVB protocol. For example, when in the first mode, the portion 200 operates so that the queue 208-3 is treated as a Class A queue according to the AVB protocol, and the queue 208-2 is treated as a Class B queue according to the AVB protocol, in an embodiment. For instance, when in the first mode, the demultiplexer unit 220 places packets with a frame priority of value 3 (as an example) into the queue 208-3, places packets with a frame priority of value 2 (as an example) into the queue 208-2, and places packets with a frame priority of value other 2 or 3 (as an example) into the queue 208-1 or the queue 208-0, in an embodiment. In an embodiment, when in the first mode, the portion 200 operates so that packets enqueued in the queue 208-3 and the queue 208-2 are handled according to guaranteed delivery, a defined throughput, and/or a defined latency. On the other hand, when in the first mode, the portion 200 operates so that packets enqueued in the queue 208-1 and the queue 208-0, are handled with best effort delivery, in an embodiment.

In an embodiment, the portion 200 is also configurable to operate in a second mode when the port 112 associated with the portion 200 is communicatively coupled to a device that is not operating according to the AVB protocol. For example, when in the second mode, the demultiplexer unit 220 is not limited to placing packets with a frame priority of value 3 (as an example) into the queue 208-3, placing packets with a frame priority of value 2 (as an example) into the queue 208-2, and placing packets with a frame priority of value other 2 or 3 (as an example) into the queue 208-1 or the queue 208-0, in an embodiment. In an embodiment, when in the second mode, the portion 200 operates so that packets enqueued in the queues 208 are handled with best effort delivery.

In some embodiments, the frame priority indicator for a packet is mapped to a queue priority indicator that indicates in which one of the queues 208 a packet should be placed. In an embodiment, the queue priority mapper 140 (FIG. 1) generates a queue priority indicator for a packet based on frame priority associated with the packet. In an embodiment, the queue priority mapper 140 (FIG. 1) generates a first queue priority indicator for a packet based on frame priority associated with the packet, and generates a second queue priority indicator for the packet based on frame priority associated with the packet. In an embodiment, the first queue priority indicator is utilized when the portion 200 is configured to operate in the first mode, and the second queue priority indicator is utilized when the portion 200 is configured to operate in the second mode.

Figure 3:
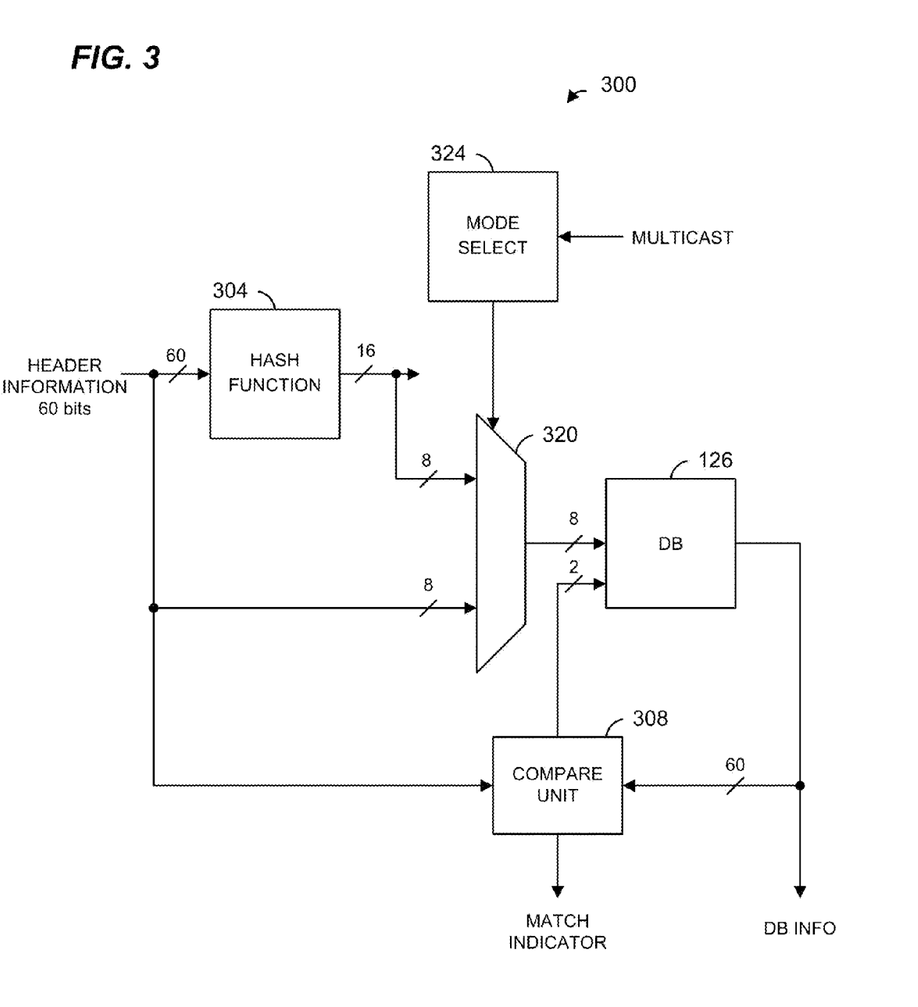
FIG. 3 is a block diagram of an example address translation unit (ATU) 300, according to an embodiment.

FIG. 3 is a block diagram of an example address translation unit (ATU) 300, according to an embodiment. The ATU 300 is included in the forwarding engine 124 of the enhanced AVB switch 108 of FIG. 1, in an embodiment. FIG. 3 is discussed with reference to FIG. 1 for ease of explanation. In some embodiments, however, the ATU 300 is utilized with a suitable switch device other than the enhanced AVB switch 108 of FIG. 1.

The ATU 300 includes the forwarding database 126 that stores forwarding information corresponding to different destination addresses (DAs). For example, for a unicast DA, the forwarding database 126 stores an indication of a particular port 112 to which packets having the unicast DA are to be forwarded. As another example, for a multicast DA, the forwarding database 126 stores indication(s) of one or more particular ports 112 to which packets having the multicast DA are to be forwarded. In an embodiment, the forwarding database 126 stores DAs as well, as will be described below in more detail. In some embodiments, the forwarding database 126 stores information indicating how packets with a particular DA are to be handled, as will be described below in more detail. In some embodiments, information in the forwarding database 126 is associated with a combination of information from packet headers rather than DAs alone. For example, in an embodiment, information in the forwarding database 126 is associated with a combination of DA and a VLAN identifier (VID).

The ATU 300 includes a hash function unit 304 that performs a suitable hash function on a set of information in a packet header. For example, in an embodiment, the hash function unit 304 performs the hash function on a combination of a DA and a VID in the header of a packet. In other embodiments, the hash function unit 304 performs the hash function on the DA alone or in combination with information other than the VID, and/or on the DA, the VID, and additional header information. In an embodiment, the hash function is a cyclic redundancy check (CRC) function. In other embodiments, other suitable hash functions are utilized. Merely for explanatory purposes, FIG. 3 is discussed using an example of the hash function unit 304 performing the hash function on a combination of a 48-bit DA and a 12-bit VID.

The hash function unit 304 generates a hash value having less bits than the number of bits input to the hash function unit 304. For example, in an embodiment, the hash function unit 304 generates a 16-bit hash value. In other embodiments, the hash function unit 304 generates a hash value with a suitable number of bits other than 16.

Bits from the hash value are utilized as address signals to the database 126. For example, in an embodiment, fewer than all of the hash value bits are utilized as address signals to the database 126. In a specific example, in an embodiment, eight of the hash value bits are utilized as most significant address signals to the database 126. In other embodiments, other suitable numbers of hash value bits are utilized.

The ATU 300 includes a comparison unit 308. The comparison unit 308 generates least significant address signals to the database 126, in an embodiment. For example, in an embodiment, the comparison unit 308 generates two least significant address signals to the database 126. The comparison unit 308 also compares an output of the database 126 with the header information input to the hash function to determine whether there is match between the header information and the database 126 output.

Thus, in an embodiment and in some scenarios (as is discussed in more detail below), bits of the hash value specify a set of locations in the database 126, and the address signals output by the comparison unit 308 are used to access the individual locations in the set of locations specified by the bits of the hash value. In embodiments in which the comparison unit 308 generates two least significant address signals to the database 126, each set of locations specified by the hash value bits comprises four locations. Each set of locations specified by the hash value bits is referred to as a "bucket", and each bucket includes four locations, in an embodiment.

In operation explained with the specific embodiment of FIG. 3, eight bits the hash value are utilized to specify a bucket (set) of four locations in the database 126. In other embodiments, other suitable numbers of hash value bits are utilized to specify the bucket. The comparison unit 308 generates different values for the two address signals to select each of the four locations in the database 126. As the comparison unit 308 receives each output of the database 126, the comparison unit 308 compares the database 126 output with the header information to determine if there is a match. When a match is detected, the comparison unit 308 generates a match indicator. The ATU 300 also provides information from the database 126 that corresponds to the match. In an embodiment, the information from the database 126 indicates a port or ports to which the packet having the header information is to be forwarded for transmission. In an embodiment, the information from the database 126 also includes information indicating how the packet is to be handled or processed, as will be described in more detail below, in an embodiment.

In an embodiment, the ATU 300 includes a selector unit 320 (e.g., a switch, a multiplexer, etc.) having two or more inputs and an output coupled to the database 126. In an embodiment, the bits of the hash value are provided as one of the inputs and selected bits of the header information are provided as another of the inputs. In an embodiment, eight bits of the header information are provided as an input to the selector unit 320. In other embodiments, another suitable number of bits and/or another set of bits of the header information is provided to the selector unit 320.

In an embodiment, the output of the selector unit 320 is coupled to address signals of the database 126.

A mode select unit 324 is coupled to the selector unit 320. The mode select unit 324 controls the selector unit 320 to select i) bits of the hash value, or ii) selected bits of the header information to be provided as address signals to the database 126. In other embodiments, the selector unit 320 includes more than two inputs and the mode select unit 324 controls the selector unit 320 to select one of the more than two inputs to be provided as address signals to the database 126.

In an embodiment, eight bits of the header information are provided as an input to the selector unit 320, and the eight bits of the header information correspond to the lower eight bits of the DA. In an AVB network, multicast addresses are often allocated sequentially. As a result, the hash values of different multicast addresses utilized in the AVB network frequently can be the same. This may lead to a "bucket" quickly filling with multicast addresses and the database 126 being unable to store all of the multicasts addresses sought to be utilized in the AVB network.

Thus, in an embodiment, the mode select unit 324 selects the header information bits to be utilized to address the database 126 when a multicast address is being analyzed, in an embodiment. In an embodiment, the lower eight address bits of the DA are selected to be utilized. In other embodiments, other bits of the DA are selected, such as alternating bits, etc.

In other embodiments, a separate hash function is utilized for multicast addresses, and the mode select unit 324 selects the separate hash function to be utilized to address the database 126 when a multicast address is being analyzed. More generally, multicast destination addresses are mapped into the database 126 differently than unicast DAs, in an embodiment.

In an embodiment, the mode select unit 324 receives a multicast indicator signal. The multicast indicator signal is generated in a suitable manner, such as by detecting that the DA is within a range specified by a communication protocol for multicast addresses. The mode select unit 324 controls the selector unit 320 based on the received multicast indicator, in an embodiment.

In another embodiment, the mode select unit 324 also receives an AVB packet indicator signal that indicates when a packet is an AVB packet. The AVB packet signal is generated in a suitable manner, such as by detecting that the packet was received via an AVB port. The mode select unit 324 controls the selector unit 320 based on the received multicast indicator and the received AVB packet indicator, in an embodiment. For example, in an embodiment, the mode select unit 324 selects the header information bits to be utilized to address the database 126 when a multicast address of an AVB packet is being analyzed, but otherwise (including when a non-AVB packet is a multicast packet) selects the hash value bits to be utilized to address the database 126, in an embodiment.

Figure 4:
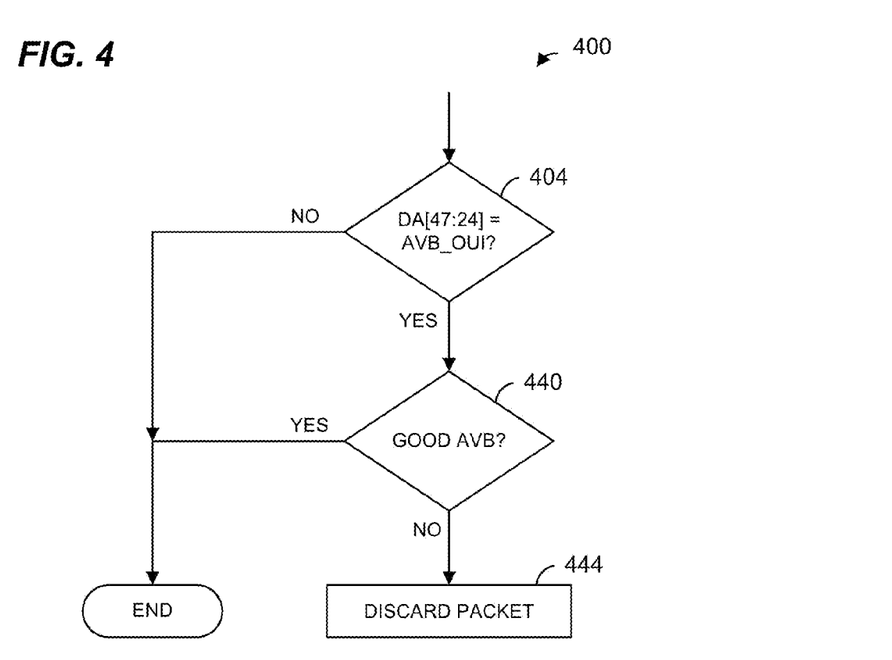
FIG. 4 is a flow diagram of an example method for determining whether to discard a packet, according to an embodiment.

FIG. 4 is a flow diagram of an example method 400 for determining whether to discard a packet, according to an embodiment. The method 400 is implemented at least partially by the ingress processing unit 116 of FIG. 1, in an embodiment, and the method 400 is described with reference to FIG. 1 for ease of explanation. In other embodiments, the method 400 is implemented in another suitable switch.

Figure 5:
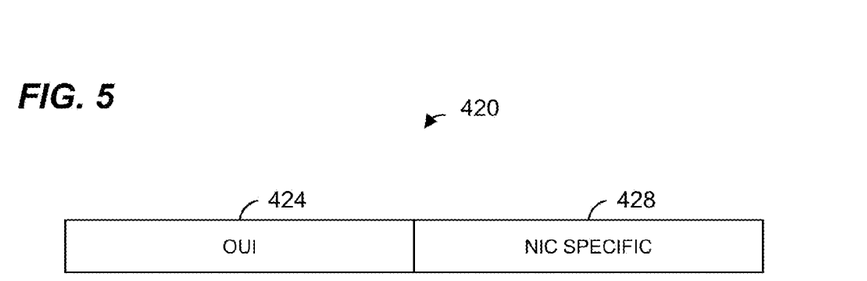
FIG. 5 is a diagram of an Ethernet destination address, according to an embodiment.

At block 404, it is determined whether a portion of a DA of a packet corresponds to a particular organizationally unique identifier (OUI) (AVB_OUI). In an embodiment, AVB_OUI corresponds to an OUI assigned to or otherwise associated with the enhanced AVB switch 108 or another device in the network 100. FIG. 5 is a diagram of a 48-bit Ethernet address 420, according to an embodiment. A most significant portion (bits 47 to 24) corresponds to an OUI. A least significant portion (bits 23 to 0) corresponds to a network interface controller (NIC) specific portion of the address. Referring now to FIGS. 4 and 5, block 404 includes comparing bits 47:24 of a DA of the packet to the AVB_OUI, in an embodiment. If it is determined that the portion of the DA does not match the AVB_OUI, the flow ends. On the other hand, if the portion of the DA matches the AVB_OUI, the flow proceeds to block 440.

At block 440, it is determined whether the packet is an AVB packet. Determining whether a packet is an AVB packet is performed in a suitable manner. In an embodiment, a packet is determined to be an AVB packet when the packet is received via an AVB port 112 and a frame priority indicator associated with the packet corresponds to one of a plurality of defined frame priority values for the AVB protocol. For example, the AVB protocol specifies that AVB packets have a PCP field value of 2 or 3. In another embodiment, a packet is determined to be an AVB packet additionally when the database 126 includes information associated with a DA of the packet that indicates that packets with the DA are AVB packets. This may be useful, for example, for permitting AVB packets to ingress through a non-AVB port so that AVB packets can be tunneled through a non-AVB network. Other suitable methods for determining whether a packet is an AVB packet are utilized additionally or alternatively in other embodiments and/or scenarios.

If it is determined at block 440 that the packet is an AVB packet, the flow ends. On the other hand, if it is determined at block 440 that the packet is not an AVB packet, the flow proceeds to block 444. At block 444, the packet is discarded. In an embodiment, packets are discarded at block 444 because non-AVB packets should not have an OUI equal to AVB_OUI, at least in most scenarios.

In an embodiment, block 444 includes the queue controller 128 not enqueuing the packet for egress. In other embodiments, some discarded packets are trapped for further analysis by the controller 120.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   determining, at a network switch, whether a received packet is of a multicast-type;
   determining, at the network switch, whether the received packet is of an audio video bridging (AVB)-type;
   if it is determined that i) the received packet is not of the multicast-type, or ii) the received packet is not of the AVB-type, selecting, at the network switch, a first candidate index as an index for looking up forwarding information for the received packet in a forwarding database;
   if it is determined that i) the received packet is of the multicast-type, and ii) the received packet is of the AVB-type, selecting, at the network switch, a second candidate index as the index for looking up the forwarding information for the received packet in the forwarding database;
   wherein
   the first candidate index is generated using a hash function applied to address information from a media access control (MAC) address field in a header of the received packet, and
   the second candidate index is generated based on the MAC address field in the header of the received packet such that MAC addresses for packets corresponding to the second candidate index are mapped to the forwarding database differently than MAC addresses for packets corresponding to the first candidate index;
   performing, at the network switch, a lookup operation in the forwarding database using the selected index to retrieve forwarding information for forwarding the received packet; and
   using, at the network switch, the forwarding information to determine one or more ports via which the packet should be transmitted.

2. The method of claim 1, wherein the second candidate index comprises a set of least significant bits of the MAC address field.

3. The method of claim 2, wherein the set of least significant bits of the MAC address field comprises 8 least significant bits of the MAC address field.

4. The method of claim 1, wherein the second candidate index comprises alternating bits of the MAC address field.

5. The method of claim 1, wherein performing the lookup operation in the forwarding database using the selected index comprises:
   using the selected index as a set of most significant bits of an address in the forwarding database; and
   using another index, separate from the selected index, as a set of least significant bits of
   the address in the forwarding database.

6. The method of claim 1, wherein the second candidate index is generated using a hash function separate from the hash function used for generating the first candidate index.

7. A network device, comprising:
   a forwarding engine device, including:
   an index selector device configured to
   select, as an index for looking up forwarding information in a forwarding database for a received packet, a first candidate index if i) the received packet is not of a multicast-type, or ii) the received packet is not of an audio video bridging (AVB)-type, and
   select, as the index for looking up the forwarding information in the forwarding database for the received packet, if i) the received packet is of the multicast-type, and ii) the received packet is of the AVB-type; and the forwarding database, wherein the first candidate index and the second candidate index correspond to respective sets of locations in the forwarding database; and wherein the first candidate index is generated using a hash function applied to address information from a media access control (MAC) address field in a header of the received packet, and the second candidate index is generated based on the MAC address field in the header of the received packet such that MAC addresses for packets corresponding to the second candidate index are mapped to the forwarding database differently than MAC addresses for packets corresponding to the first candidate index; and wherein the forwarding engine device is configured to perform a lookup operation in the forwarding database using the selected index to retrieve forwarding information for forwarding the received packet, and use the forwarding information to determine one or more ports via which the packet should be transmitted.

8. The apparatus of claim 7, wherein the second candidate index comprises a set of least significant bits of the MAC address field.

9. The apparatus of claim 8, wherein the set of least significant bits of the MAC address field comprises 8 least significant bits of the MAC address field.

10. The apparatus of claim 7, wherein the second candidate index comprises alternating bits of the MAC address field.

11. The apparatus of claim 7, wherein:

the forwarding engine device is configured to determine whether the received packet is of the audio video bridging (AVB)-type.

12. The apparatus of claim 7, wherein the forwarding engine device is configured to:

use the selected index as a set of most significant bits of an address in the forwarding database; and use another index, separate from the selected index, as a set of least significant bits of the address in the forwarding database.

\* \* \* \* \*